United States Patent [19]

Fiala

[11] 4,411,171
[45] Oct. 25, 1983

[54] VEHICLE DRIVE

[75] Inventor: Ernest Fiala, Wolfsburg, Fed. Rep. of Germany

[73] Assignee: Volkswagenwerk Aktiengesellschaft, Wolfsburg, Fed. Rep. of Germany

[21] Appl. No.: 272,217

[22] Filed: Jun. 10, 1981

[30] Foreign Application Priority Data

Jun. 14, 1980 [DE] Fed. Rep. of Germany ....... 3022373

[51] Int. Cl.³ .................... F16H 37/06; B60K 41/08; B60K 9/04; B60K 41/28
[52] U.S. Cl. ........................................ 74/675; 74/572; 74/686; 74/752 R; 74/789; 192/0.098; 192/87.1; 192/0.076; 180/165
[58] Field of Search ............ 192/0.02 R, 0.098, 0.096, 192/3.58, 3.57, 48.1, 87.1, 87.14, 0.077, 0.076; 180/165; 74/674, 675, 679, 686, 760, 761, 572, 781, 785, 789, 752 R

[56] References Cited

U.S. PATENT DOCUMENTS

| 3,296,894 | 1/1967 | Moan | 74/572 X |
| 3,476,201 | 11/1969 | Swaine | 74/572 X |
| 3,566,717 | 3/1971 | Berman et al. | 74/686 X |
| 3,749,194 | 7/1973 | Bardwick | 180/165 |
| 3,861,484 | 1/1975 | Joslin | 74/675 |
| 3,882,950 | 5/1975 | Strohlein | 74/572 |
| 3,923,115 | 12/1975 | Helling | 180/165 |
| 4,116,006 | 9/1978 | Wallis | 74/572 |
| 4,215,545 | 8/1980 | Morello et al. | 180/165 X |
| 4,252,208 | 2/1981 | Heidemeyer et al. | 74/859 |

Primary Examiner—George H. Krizmanich
Attorney, Agent, or Firm—Brumbaugh, Graves, Donohue & Raymond

[57] ABSTRACT

A vehicle having an internal combustion engine and flywheel includes a first clutch arranged between the flywheel and the vehicle drive shaft and a second clutch arranged between the flywheel and engine for selectively disconnecting the engine from the vehicle drive. A motor-generator is connected to the flywheel by a planetary gear train which includes a planetary gear carrier rigidly connected with the output drive shaft. during a first driving stage, the clutch between the flywheel and vehicle drive shaft is disconnected, such that the flywheel is coupled to the drive shaft through the planetary gear train. In a second driving stage, the clutch between the flywheel and vehicle output shaft is engaged to effect a direct connection between the flywheel and output shaft. In both driving stages, the vehicle can be driven by the engine, or by the motor-generator, or by the engine and motor-generator combined.

9 Claims, 2 Drawing Figures

VEHICLE DRIVE

BACKGROUND OF THE INVENTION

The present invention is an improvement in a drive for vehicles, in particular passenger automobiles, of the type where a flywheel is connected between the engine and drive shaft by a pair of selectively actuatable clutches.

Commonly-owned U.S. Pat. No. 4,252,208 discloses a vehicle drive in which the flywheel, normally present for absorbing non-uniformities of engine output torque, may be selectively disconnected from the engine using a clutch arranged between the engine and flywheel. The flywheel is disconnected from the engine, for example, during overrun, i.e. deceleration, operating conditions of the vehicle, and may also be disconnected from the engine drive wheels by a second clutch, for example during idling. Once disconnected, the engine may be stopped to conserve fuel. While the engine is stopped, the flywheel, which continues to rotate, acts to store kinetic energy. Upon termination of the overrun operating state or idling, when it is desirable to restart the engine, the engine and flywheel are reconnected, and the stored kinetic energy in the flywheel is utilized to re-start the engine.

SUMMARY OF THE INVENTION

The present invention is an improvement in the drive arrangement described above which avoids in particular the losses occurring on starting due to slippage of the starting clutch, and which provides novel methods for operation of the vehicle.

More particularly, a vehicle in accordance with the invention has an internal combustion engine, a flywheel associated with the engine, and a drive shaft coupled with the drive wheels of the vehicle. A first clutch is arranged between the flywheel and the drive shaft for selectively uncoupling the flywheel from the drive shaft. A second clutch is arranged between the flywheel and the engine for selectively uncoupling the engine from the flywheel. A motor-generator is connected by a planetary gear train to the flywheel. The planetary gear train includes a sun gear connected with the flywheel, a ring gear connected with a drive of the motor-generator, and planetary gears between the sun gear and ring gear. The planetary gears are mounted on planetary gear carriers which are rigidly connected with the drive shaft. In addition, a brake arrangement, fixed relative to the vehicle, is provided for selectively acting on the flywheel.

The drive, which includes the connection between the flywheel and the motor-generator, by way of a planetary gear train, and the planetary gear carrier rigidly connected with the vehicle drive shaft, may be operated in several different and advantageous configurations, adapted to the particular driving conditions, by selective control of the two clutches together with the flywheel brake.

The vehicle may be driven totally electrically, solely by the engine, or by the combined power output of the engine and motor-generator (operated as a motor). At small driving speeds and loads, an internal combustion engine would operate with very low efficiency, and it is thus advantageous to drive the vehicle electrically using only the motor-generator, in its motor operating mode. At engine operating conditions requiring larger driving power, it is advantageous to combine the power output of the motor-generator with the internal combustion engine to produce a greater net power output. Where somewhat less power is needed, the engine output torque can power the vehicle, and if desired a portion of the engine output torque can be used to drive the motor-generator as a generator to generate electricity. The generated electricity can power the vehicle electrical system and be used to recharge the vehicle batteries.

By selective operation of the clutches, the above-described structural configuration also permits favorable starting of the internal combustion engine. The motor-generator is used in the generator mode, and the regenerative braking thus imparted on the planetary gear train is utilized to effect a gradual starting of the vehicle. Moreover, once the vehicle is moving the motor-generator can be switched, if desired, from its generator mode, where it is absorbing part of the engine output torque and thereby generating electricity, to its motor operating mode to help drive the vehicle drive shaft and thus increase the net horsepower delivered to the driving wheels.

In either of the foregoing vehicle operating modes, selective operation of the first clutch (i.e. the clutch between the flywheel and the drive shaft) produces varying ratios between the motor drive and the drive shaft (in the electrical operating mode) and between the engine crankshaft and vehicle drive shaft (in the engine driving mode).

For a better understanding of the invention, reference is made to the drawings accompanying the application, along with the detailed description of the preferred embodiments of apparatus and methods of operation, set forth below.

DETAILED DESCRIPTION OF A PREFERRED EMBODIMENT

Figure 1:
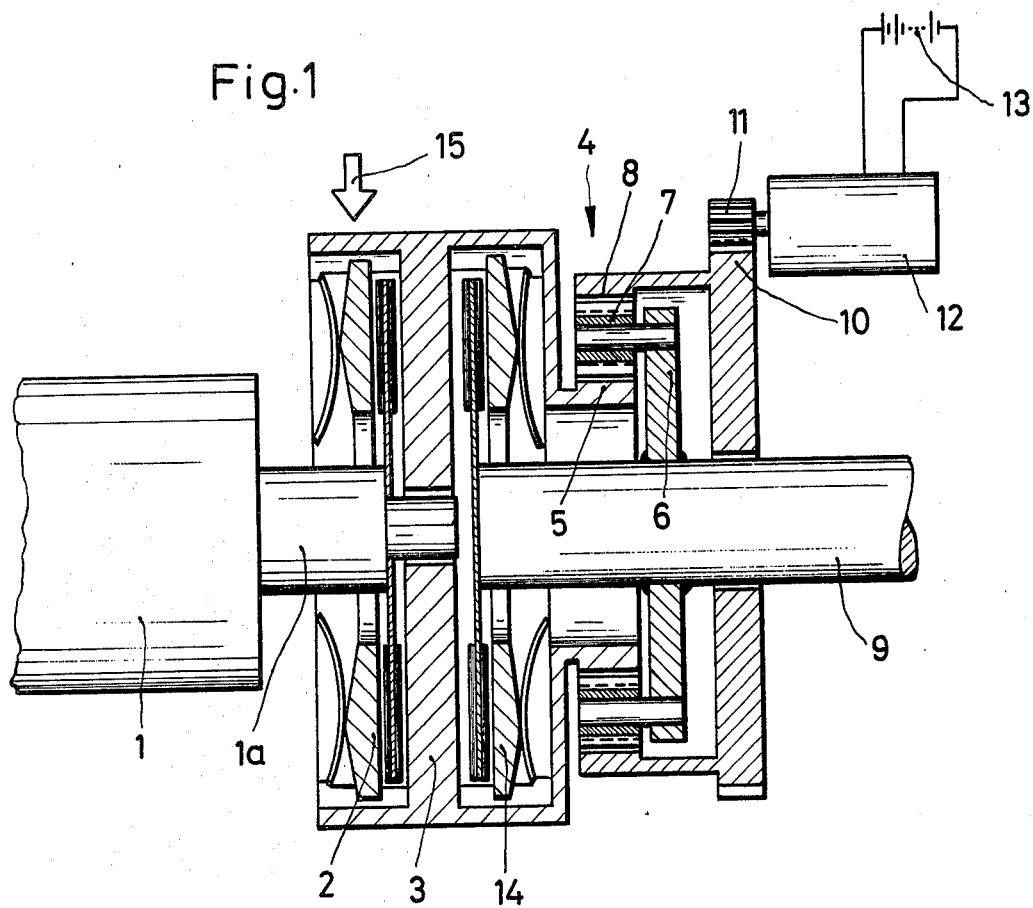
FIG. 1 is a longitudinal sectional view, in schematic form, of a drive in accordance with the invention.

An internal combustion engine 1, for example a reciprocating piston engine, includes an output crankshaft 1a. A frictional clutch 2 is arranged between the crankshaft 1a and a flywheel 3 associated with the driving motor 1. The flywheel 3 may be connected by a second clutch 14 to the vehicle drive shaft 9, which leads either directly to a driving axle of the vehicle, or to a speed change transmission.

The flywheel 3 is connected via a planetary gear train 4 with a drive 10, 11 of a motor-generator 12 of standard design. A sun gear 5, connected to the flywheel 3, may be formed as part of the flywheel 3. The sun gear 5 meshes with planet gears 7, which in turn mesh with a ring or outer gear 8. The ring gear 8 is connected to, and may be formed as part of, the toothed gear 10. The planet gears 7 are supported on a planet gear carrier 6, which is rigidly connected with the drive shaft 9 for rotation therewith.

As described above, the toothed gear 10 is connected rigidly with the ring gear 8 of the planetary gear train 4. The gear 10 meshes with the pinion 11 of the motor-generator 12. The motor-generator 12 is connected with the battery 13 of the vehicle electrical system, and may be operated selectively as either a motor for driving the pinion 11, gear 10 and planetary gear train 4, or as a generator, in which case it is driven by gears 7, 8, 10 and 11 to generate electricity for storage in the battery 13 or for running the vehicle electrical system.

In addition to the interconnection of the flywheel 3, the planetary gear train 4, and the drive shaft 9 through the planetary gear carrier 6, the planetary gear train 4 can be bridged by a clutch 14 to produce direct connection between the flywheel 3 and the drive shaft 9. Also, the flywheel 3 may be held relative to the housing (not shown) for the drive, i.e. stationary relative to the vehicle, by a brake or clutch indicated schematically at 15.

The foregoing structure enables the vehicle drive to be operated in a number of different modes. In the first instance, a purely electrical drive is possible. Such a drive may be desirable for low velocities, e.g. forward and backward maneuvering or advancing in congested stop-and-go traffic, where small power requirements of the vehicle are needed, and where an internal combustion engine would operate with very low efficiency.

In order to effect such a driving mode, clutches 2 and 14 are disengaged and the flywheel 3 is held stationary by applying the brake 15. When the motor-generator 12 is operated in its motor mode, the motor-generator 12 drives the pinion 11 meshing with the toothed gear 10, which through the ring gear 8 rotates the planetary gears 7. The sun gear 5, however, is held stationary by the brake 15, so that rotation of the planetary gears 7 acts to drive the planetary gear carrier 6 circumferentially about the axis of the drive shaft 9. Since the gear carrier 6 is fixed relative to the shaft 9, the circumferential movement of the carrier 6 produced by rotation of the driven planet gears 7 rotates the drive shaft 9 with a ratio determined by the planetary drive.

Using still a completely electrical drive, the transmission ratio between the motor-generator 12 and output shaft 9 may be changed by disengaging the brake 15 and engaging the clutch 14. In this driving mode, all the elements of the planetary gear train 4 rotate without relative movement, and the gear 10, planetary gear train 4, flywheel 3, and drive shaft 9 rotate as a block, with a ratio 1:1, driven by the motor 12. In effect, then, two forward speed ratios are possible in the electrical drive configuration.

At larger driving power requirements, the internal combustion engine must also be used. The novel construction of the present drive permits several operating modes for starting the stopped engine while the vehicle is stationary. Assuming the flywheel rpm is below that needed to re-start the engine, the motor-generator 12, with the clutches 2 and 4 disengaged (so that the flywheel 3 is disconnected from both the engine 1 and drive shaft 9) and the brake 15 released, drives the flywheel 3 through the planetary gear train 4. During the speed increase phase of the flywheel 3, the output shaft is held stationary, for example, using a hand or foot brake, normally present in the vehicle. As soon as a predetermined flywheel rpm has been reached, in which the flywheel has sufficient kinetic energy for restarting the stopped engine 1, the clutch 2 is engaged so that the engine is connected to the flywheel 3, and the flywheel 3 rotates the engine crankshaft 1a, utilizing the stored kinetic energy, to re-start the engine 1.

When the vehicle is moving, and the engine has been stopped (for example, due to engine overrun conditions) to conserve fuel, the clutch 2 between the flywheel 3 and engine 1 is disengaged such that the driving wheels, coupled to the drive shaft 9, are not connected to the engine. When the vehicle is thus moving, the brake 15 is disengaged and the clutch 14 engaged. At the termination of the deceleration operating condition, the engine 1 may be re-started by reengaging the previously opened clutch 2, which reconnects the internal combustion engine 1 to the flywheel mass 3 and forces the engine crankshaft 1a to rotate.

The structure as described above also enables a gradual start of the stopped vehicle when the engine is idling, for example after the engine has been re-started by the motor-generator as described above. When the engine is idling, the clutch 2 is engaged, so that the engine is connected to the flywheel 3, but the clutch 14 and the brake 15 are disengaged. In this condition, the ring gear 8 of the planetary gear train 4 rotates in the direction opposite that of the flywheel 3 and the crankshaft 1a because of the stationary planetary gear carriers 6. Normally, the engine output torque, which is transmitted by the engaged clutch 2 to the flywheel 3, is transmitted across the planetary gears 7 to drive the gears 8 and 10 and input pinion 11 of the motor-generator 12. Compared with the torque necessary to rotate the drive shaft 9 and thus the vehicle driving wheels (due to the vehicle weight on the driving wheels), the torque necessary to rotate the pinion 11 is relatively small. As a result, the engine output torque will normally rotate the gears 8, 10 and 11 rather than cause the planetary gear carrier 6 and thereby the shaft 9 to rotate.

However, by providing a braking moment to the pinion 11 and thereby the gear 8, i.e. resisting a free rotation of the gears 8, 10 and 11, a reaction force is imparted on the planetary gear carriers 6 to transmit a proportional driving moment to the drive shaft 9. Such a braking moment can be imparted through the motor-generator 12 by operating the motor-generator 12 as a generator. The planetary gear carrier 6 thus starts to rotate in the same direction as the flywheel 3 and crankshaft 1a of the engine 1, and the vehicle begins gradually to move forward.

As the braking moment produced by the motor-generator 12 causes the shaft 9 to rotate, the rpm of the ring gear 8 and thereby the motor generator 12 is correspondingly decreased. The regenerative braking energy is thus used for the dual purpose of conversion by the motor-generator 12 into electrical energy to be stored in the battery 13 and provision of a counter-force for causing the planetary gear carrier 6 and thereby the shaft 9 to rotate. By suitable electrical control of the moment delivered to the motor-generator 12 operated in the generator mode, a very gradual uniform start of the vehicle may be effected.

After the vehicle has begun its forward motion, and with increasing vehicle velocity, the rpm of the ring gear 8 of the planetary gear train 4 is reduced further, and thus the rpm of the motor-generator pinion 11 is further reduced. With further acceleration of the vehicle, where the rpm of the ring gear 8 approaches zero, the power delivered to the drive shaft 9 can be further increased by reversing the operating mode of the motor-generator 12 from generator to motor, such that the gear 8 (which initially was rotating counter to the flywheel 3 and the crankshaft 1a) is now driven by the motor 12 in the same direction as the flywheel 3 and crankshaft 1a. By thus using the motor-generator 12 to rotate the gear 8, the upper limit of the speed range in this driving stage is increased as opposed to an arrangement where the gear 8 operates only at negative rpm or is stationary.

In the above described driving stage, the engine starts the vehicle from a standing stop by driving the drive shaft 9 through the planetary gear train 4, initially utilizing regenerative braking drag and thereafter positive driving force, from the motor-generator 12, to accelerate the vehicle. During this first driving stage, the clutch 14 remains disengaged.

During normal road travel, for higher speed and load requirements, the flywheel 3 may be connected directly with the output shaft 9 by engaging the clutch 14. When the clutch 14 is engaged, the planetary gear train 4, which then rotates as a block, is bridged. In this second driving stage, the motor-generator 12 may also be operated either as a motor or as a generator. As shown in FIG. 1, when the clutch 14 is closed, the elements 3, 5, 6, 7, 8 and 10 rotate in fixed relation, and rotation of the flywheel 3 is thus transmitted rigidly to the gear 10 driving pinion 11. If additional power is desirable for driving the drive shaft 9, the battery 13 can drive the motor-generator 12 to rotate the pinion 11. The power imparted by the pinion 11 acts to rotate the block elements 10, 8, 7, 6, 5 and 3, and thereby the drive shaft 9, and is additive to the rotational torque delivered from the engine 1. When less power is required, the engine 1 alone can drive the drive shaft 9. If desired, part of the engine output torque can be transmitted to drive the pinion 11, wherein the motor-generator 12 is in the regenerative phase. Part of the engine power, therefore, acts to drive the motor-generator 12 for providing electricity to the vehicle battery 13 or electrical system. In this latter case, the power diverted to run the motor-generator 12 as a generator is subtracted from the total torque output available to drive the drive shaft 9.

Figure 2:
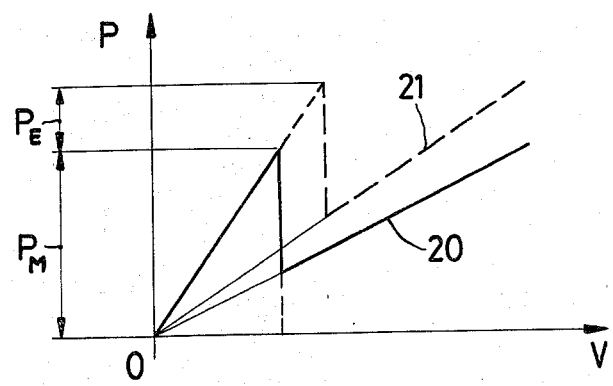
FIG. 2 is a diagram of the total power available for the vehicle plotted against driving speed.

FIG. 2 illustrates a diagram of the available power P plotted over the travel speed of the vehicle over first and second driving stages of the vehicle where, during the first driving stage, the engine drives the drive shaft 9 through the planetary gear train 4 (i.e. with clutch 14 open), and where during the second driving stage the engine 1 drives the drive shaft 9 directly through the engaged clutch 14. The solid line 20 denotes the power $P_M$ of the internal combustion engine alone (i.e. where, for example, motor-generator 12 is used only as a generator, and thus gear 8 rotates counter to drive shaft 9 or is held stationary relative to the vehicle). The broken line curve 21 represents the combined power available from the engine and motor-generator 12, when the motor-generator 12 is operated as a motor to drive the gear 8.

With the engine starting from idle, the vehicle is operated in its first stage of operation, where the clutch 14 is disengaged, such that power is transmitted from the engine 1 to the flywheel 3 and thereafter to the planetary gear train 4 to drive the planetary gear carrier 6. When a predetermined engine rpm is reached, the clutch 14 is engaged so that the vehicle switches to its second driving stage. When the vehicle switches to the second driving stage, a sharp drop in the available power level results due to the change in transmission ratio between the flywheel 3 and the drive shaft 9 (i.e. transmission across the planetary gear train 4 versus direct 1:1 transmission across the clutch 14).

As described above, in the first driving stage rotation of the flywheel 3 causes the planetary gear carriers 6 to rotate, and thus produces an output rpm in the drive shaft 9 dependent upon the particular gear ratios in the planetary gear train 4 and the negative speed of the ring gear 8. When, however, the motor-generator 12 is used to drive gear 8 and thereby the planetary gear carriers 6 in the same direction as flywheel 3, i.e. positive rotation, such positive rotation of gear 8 is additive to the output rpm of the drive shaft 9, such that the net output rpm of drive shaft 9 is greater than that produced solely by the engine. Thus, at the upper limit of engine rpm in the first driving stage, requiring a switch-over to the second driving stage, the output rpm of drive shaft 9, and thereby the vehicle speed, is greater than where the gear 8 was not driven positively, e.g. was held stationary. A comparison of lines 20 and 21 of FIG. 2 illustrates the higher velocity permitted in a vehicle operated with a motor drive 12, i.e. line 21, in the first driving stage.

In the second driving stage (with the clutch 14 engaged) the power $P_E$ available from the motor-generator 12 is additive to the engine output torque to increase the net available output torque delivered to the drive shaft 9. Even in the illustrated example where the power $P_E$ of the motor-generator 12, in the motor operating mode, is only approximately one-third of the power of the internal combustion engine 1, in certain vehicle operating ranges a power increase of approximately 80% becomes available. As shown in FIG. 2, in the case of a vehicle operated without a driving motor 12, as represented by line 20 of FIG. 2, the switch over to the second operating stage occurs at lower velocity than in the case of line 21. During further velocity increase along line 20, until reaching such velocity where the vehicle operated with motor 12 also switches to the second operating stage, the latter operates at about 80% higher power (due primarily to the favorable transmission ratio across the planetary gear train 4).

During overrun operating conditions of the vehicle, or when the power requirements are small, the clutch 2 may be disengaged so that the vehicle drive is disconnected from the engine 1. The internal combustion engine 1, due to the uncoupling of the flywheel 3, will stop by itself or be stopped by additional measures (such as interruption of the fuel supply or the ignition). During overrun conditions, regenerative braking may be effected with energy delivered to the battery 13 through the motor-generator 12 operating as a generator. Also, during vehicle operating conditions where low driving power is needed, for which the internal combustion engine is not ideally suited, the vehicle may be driven directly by the motor-generator 12 operating as a motor, without having to re-start the engine, as described above.

The foregoing represents the preferred embodiment of the invention, and preferred modes of operation of the disclosed structure. Variations and modifications will be apparent to pesons skilled in the art without departing from the inventive concepts disclosed herein. All such modifications and variations are intended to be within the scope of the invention as defined in the following claims.

I claim:

1. In a vehicle having an internal combustion engine, a flywheel associated with said engine, a drive shaft, a first clutch means arranged between said flywheel and said drive shaft for coupling said flywheel to said drive shaft, and a second clutch means arranged between said flywheel and said engine for coupling said engine to said flywheel, the improvement comprising a motor-generator means, a planetary gear train connected between said flywheel and said motor-generator means, wherein said gear train includes a planetary gear carrier for mounting a planetary gear, and means for rigidly connecting said planetary gear carrier with said drive shaft.

2. A vehicle as defined in claim 1, wherein said motor-generator means includes a drive means, and wherein said planetary gear train includes a sun gear connected with said flywheel and a ring gear connected with said drive means, said planetary gear being arranged between said sun gear and said ring gear.

3. A vehicle as defined in claim 1 or 2, comprising braking means for selectively acting on said flywheel.

4. A method of operating a vehicle having an internal combustion engine, a flywheel associated with said engine, a drive shaft, a first clutch means arranged between said flywheel and said drive shaft for coupling said flywheel to said drive shaft, and a second clutch means arranged between said flywheel and said engine for coupling said engine to said flywheel, said method comprising the steps of:
  (a) connecting, by a planetary gear train having a planetary gear carrier, a motor-generator means to said flywheel;
  (b) rigidly connecting said planetary gear carrier to said drive shaft;
  (c) disengaging said first clutch means for operating in a first driving stage; and
  (d) re-engaging said first clutch means for operating in a second driving stage, wherein said drive shaft is driven in said first and second driving stages by at least one of said engine and said motor-generator.

5. A method as defined in claim 4, comprising further the step of disconnecting said second clutch means and stopping said internal combustion engine during overrun conditions and low power operating states of said vehicle.

6. A method as defined in claim 4 or 5, comprising the step of driving said vehicle with said motor-generator means, and further comprising the step of applying a brake to said flywheel during said first driving stage to cause said planetary gear carrier and thereby said drive shaft to rotate.

7. A method as defined in claim 4, comprising further the steps, in said first driving stage when the vehicle is stationary and said engine is stopped, of applying a brake for securing said drive shaft, disengaging said second clutch, driving said flywheel by said motor-generator via said planetary gear train, and thereafter connecting said engine with said flywheel by engaging said second clutch to re-start said engine.

8. A method as defined in claim 4, comprising further the steps, in said first driving stage when said engine is idling, of engaging said second clutch means for driving said flywheel, and operating said motor generator means as a generator for inducing drag in said planetary gear train and thereby transmitting a driving torque from said flywheel to said output drive shaft for starting said vehicle.

9. A method as defined in claim 4, comprising the step of controlling the power output from and power input to said motor-generator means for adjusting the combined power output delivered to said drive shaft from said motor-generator means and said engine during the travel of said vehicle.

* * * * *